(12) United States Patent
Izukawa

(10) Patent No.: US 10,479,248 B2
(45) Date of Patent: Nov. 19, 2019

(54) VEHICLE SEAT

(71) Applicant: TOYOTA BOSHOKU KABUSHIKI KAISHA, Aichi-ken (JP)

(72) Inventor: Hideyuki Izukawa, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 38 days.

(21) Appl. No.: 15/847,213

(22) Filed: Dec. 19, 2017

(65) Prior Publication Data

US 2018/0178698 A1 Jun. 28, 2018

(30) Foreign Application Priority Data

Dec. 27, 2016 (JP) .................. 2016-253050

(51) Int. Cl.
*B60N 2/90* (2018.01)
(52) U.S. Cl.
CPC .................... *B60N 2/914* (2018.02)
(58) Field of Classification Search
CPC ...................................................... B60N 2/914
USPC .......... 297/284.1, 284.4, 284.6, 284.2, 284.3
See application file for complete search history.

(56) References Cited

U.S. PATENT DOCUMENTS

| | | | | |
|---|---|---|---|---|
| 3,297,023 A | * | 1/1967 | Foley | A61G 7/05776 297/284.1 |
| 5,792,082 A | * | 8/1998 | Yamanaka | A61H 9/0078 601/148 |
| 6,212,719 B1 | * | 4/2001 | Thomas | A47C 4/54 297/284.6 |
| 2006/0049678 A1 | | 3/2006 | Kern et al. | |
| 2007/0228790 A1 | * | 10/2007 | Schurg | A47C 7/467 297/284.4 |
| 2010/0289302 A1 | * | 11/2010 | Cheng | B60N 2/002 297/180.12 |
| 2011/0006568 A1 | * | 1/2011 | Hsu | A47C 4/54 297/217.3 |
| 2013/0285426 A1 | * | 10/2013 | Arant | B60N 2/62 297/284.1 |
| 2014/0167465 A1 | * | 6/2014 | Sakata | B60N 2/995 297/284.11 |
| 2015/0126916 A1 | * | 5/2015 | Hall | A61H 9/0078 601/149 |
| 2016/0229316 A1 | * | 8/2016 | Tamura | B60N 2/2222 |
| 2017/0028163 A1 | * | 2/2017 | Onuma | B60W 40/09 |
| 2017/0368969 A1 | * | 12/2017 | Shibata | B60N 2/914 |
| 2018/0086238 A1 | * | 3/2018 | Onuma | B60N 2/976 |
| 2018/0111520 A1 | * | 4/2018 | Lem | B60N 2/914 |
| 2018/0170230 A1 | * | 6/2018 | Onuma | F04B 45/067 |

FOREIGN PATENT DOCUMENTS

JP 4305663 5/2009

* cited by examiner

*Primary Examiner* — Mark R Wendell
(74) *Attorney, Agent, or Firm* — Greenblum & Bernstein, P.L.C.

(57) ABSTRACT

A vehicle seat including: a surface cover covering a surface of the vehicle seat; a pad; a shape change unit including an air bag configured to expand and contract and configured to change a shape of the surface of the vehicle seat; and a buffer member provided between the air bag and the surface cover, wherein the buffer member is configured to be deformed elastically by expansion and contraction of the air bag.

8 Claims, 5 Drawing Sheets

VEHICLE SEAT

CROSS-REFERENCE TO RELATED APPLICATIONS

This application claims priority from Japanese Patent Application No. 2016-253050 filed on Dec. 27, 2016, the entire contents of which are incorporated herein by reference.

TECHNICAL FIELD

The present disclosure relates to a vehicle seat.

BACKGROUND

The following vehicle seat is disclosed in Japanese Patent No. 4305663. The vehicle seat includes a surface cover covering the surface thereof and a pad. The pad includes a through hole. An air bag is accommodated in the through hole. The air bag is in contact with the surface cover. A shape of the surface of the vehicle seat can be changed by introducing air into the air bag and making it expand, or by discharging air from the air bag and making it contract.

In the vehicle seat disclosed in Japanese Patent No. 4305663, the air bag directly contacts the surface cover. Therefore, a shape of the air bag appears on the surface cover. Additionally, when an occupant sits on the vehicle seat, the occupant feels a foreign body sensation caused by the air bag.

SUMMARY

An aspect of the present disclosure aims to provide a vehicle seat which can suppress a foreign body sensation caused by the air bag and on the surface of which the shape of the air bag hardly appears.

An aspect of the present disclosure provides a vehicle seat including: an surface cover covering a surface of the vehicle seat; a pad; a shape change unit including an air bag configured to expand and contract and configured to change a shape of the surface of the vehicle seat; and a buffer member provided between the air bag and the surface cover, wherein the buffer member is configured to be deformed elastically by expansion and contraction of the air bag.

DETAILED DESCRIPTION

Embodiments of the present disclosure will be described based on the drawings.

First Embodiment

1. The Configuration of the Vehicle Seat 1

The configuration of the vehicle seat 1 will be described based on FIGS. 1 to 4. The vehicle seat 1 includes a seat back 3 and a seat cushion 5.

Figure 4:
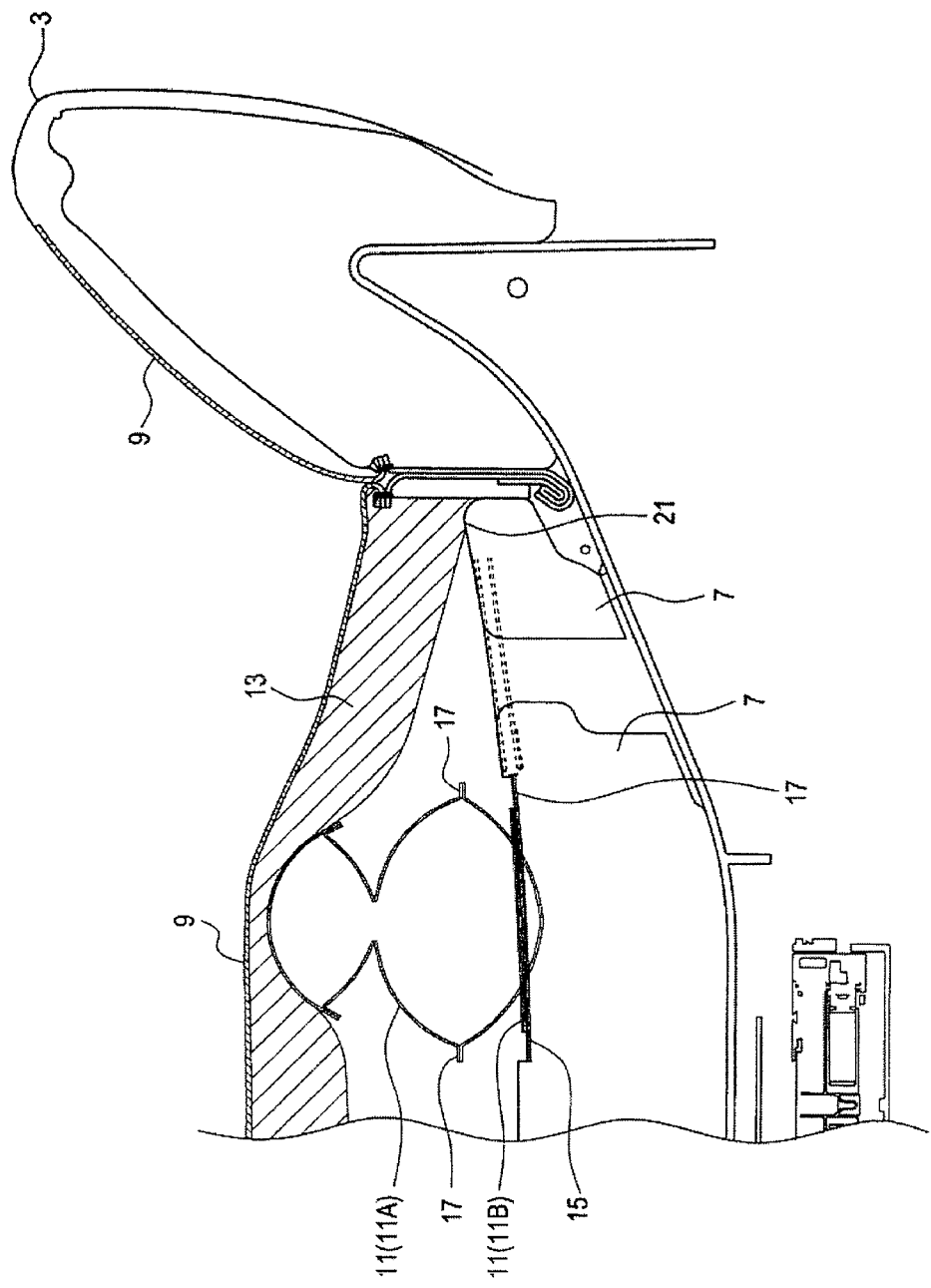
FIG. 4 is a sectional view along a line IV-IV in FIG. 2.

As shown in FIG. 4, the seat back 3 includes a back pad 7, a surface cover 9, an air bag 11 and a buffer member 13.

The back pad 7 serves as a cushion in the seat back 3. The back pad 7 includes a plurality of recessed portions 15 opened toward the surface cover 9. The recessed portion 15 is recessed further compared with surroundings of the recessed portion 15.

The surface cover 9 is a member covering a surface of the seat back 3. A material of the surface cover 9 includes, for example, leather, synthetic leather, cloth, or the like. A thickness of the surface cover 9 is smaller than a thickness of the buffer member 13.

Figure 1:
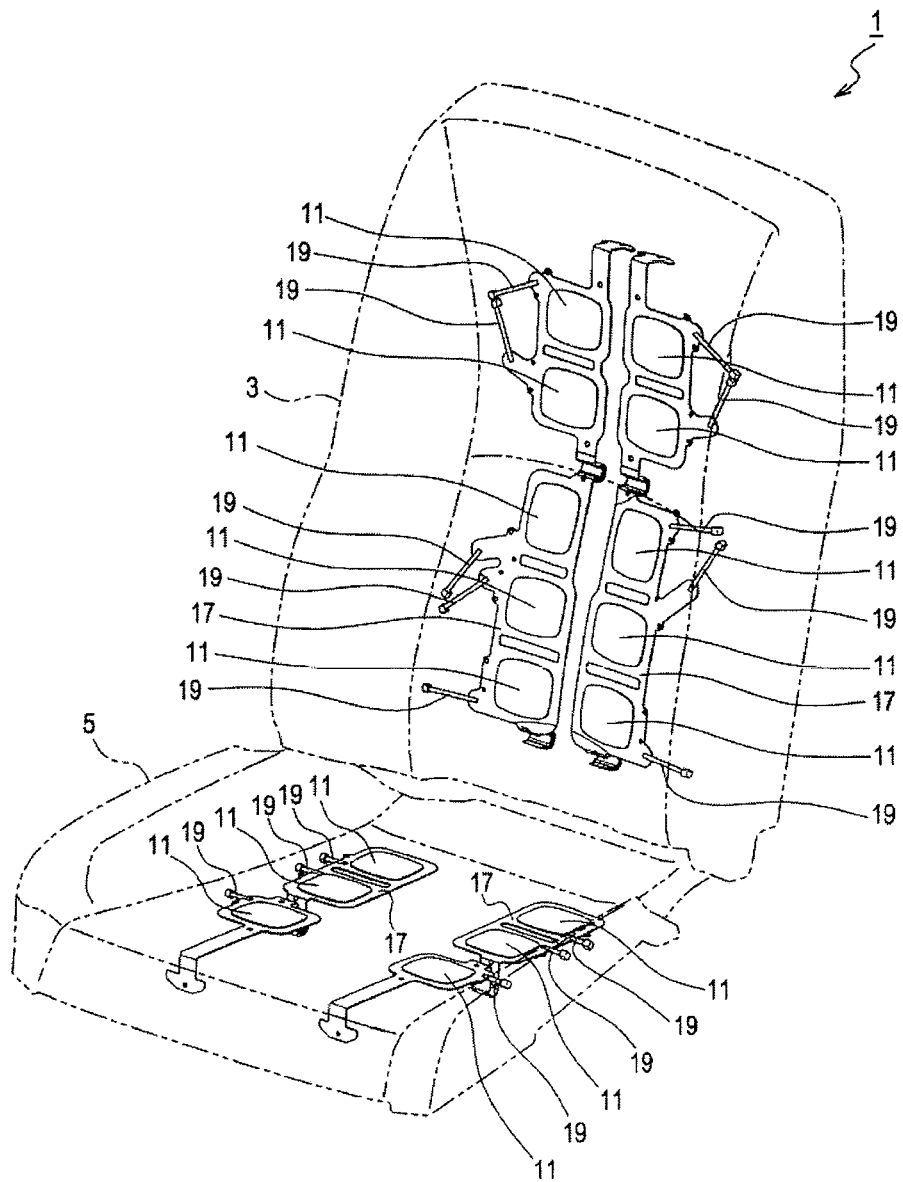
FIG. 1 is a perspective view showing a configuration of a vehicle seat 1.
Figure 2:
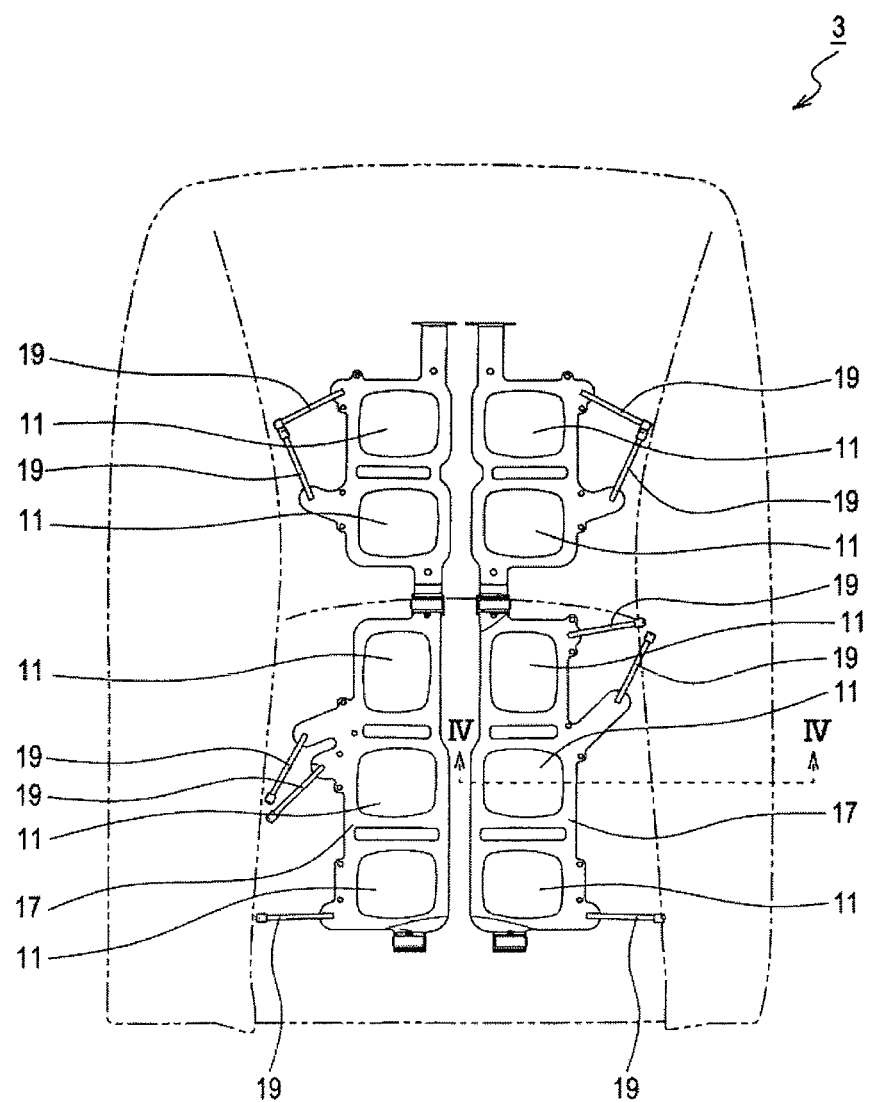
FIG. 2 is a front view showing a configuration of a seat back 3.

As shown in FIG. 1 and FIG. 2, two air bags 11 are arranged in a lateral direction and five air bags 11 are arranged in a longitudinal direction in the seat back 3. As shown in FIG. 4, the air bag 11 is provided between the back pad 7 and the buffer member 13. The air bag 11 is fixed to the back pad 7 in the recessed portion 15.

The air bag 11 can be expanded by introducing air inside. Additionally, the air bag 11 can be contracted by discharging the air introduced therein. An expanded state 11A of the air bag 11 is shown in FIG. 4. Additionally, a contracted state 11B of the air bag 11 is shown in FIG. 4.

As shown in FIG. 1 and FIG. 2, the air bags 11 arranged in the longitudinal direction are linked by an outer edge portion 17. Tubes 19 are connected to each of the air bags 11 and also connected to a pump and a valve (not shown). The air bag 11 can be expanded by driving the pump and introducing air from the tube 19 into the air bag 11 while the valve is closed. Additionally, the air introduced into the air bag 11 can be discharged via the tube 19 and the valve by opening the valve, and thus the air bag 11 can be contracted.

The air bag 11, the outer edge portion 17, the tube 19, and the pump and the valve described above correspond to a shape change unit.

As shown in FIG. 4, the buffer member 13 is provided between the air bag 11 and the surface cover 9. The buffer member 13 is bonded to the surface cover 9. The buffer member 13 is fixed to the back pad 7 at a fixed portion 21 sufficiently apart from the air bag 11. The fixed portion 21 and the back pad 7 can be fixed by using, for example, an adhesive. Other known fixing methods may be appropriately selected and used. A material of the buffer member 13 includes, for example, foamed resin, net-like fiber, rubber, or the like.

The buffer member 13 is elastically deformed by the expansion and contraction of the air bag 11. For example, as shown in FIG. 4, when the air bag 11 expands, a portion of the buffer member 13 in the vicinity of the air bag 11 is pushed out toward a surface of the seat back 3 by the air bag 11 and protrudes. A portion of the surface cover 9 in the vicinity of the air bag 11 is also pushed out toward the surface side of the seat back 3 and protruded in conjunction with the buffer member 13. As a result, a shape of the surface of the seat back 3 is changed to a shape in which a portion in the vicinity of the air bag 11 has a protruded shape as compared with the surroundings. At this time, a portion of the buffer member 13 abutting on the air bag 11 is compressed by the air bag 11, and a thickness of the portion of the buffer member 13 is reduced as compared with the surroundings. Additionally, the buffer member 13 is stretched as compared with a case where the air bag 11 is contracted.

When the air bag 11 is changed from the expanded state to the contracted state, the portion of the buffer member 13 and the surface cover 9 in the vicinity of the air bag 11 move toward a direction of the back pad 7. As a result, the shape of the surface of the seat back 3 is changed to a shape with a small degree of protrusion. At this time, a thickness of the portion of the buffer member 13 which has been compressed by the air bag 11 is recovered. Thus, the difference between the thickness of the portion of the buffer member 13 which has been compressed and the surroundings becomes smaller.

Even when the air bag 11 expands or contracts, a thickness of the fixed portion 21 is not substantially changed.

Figure 3:
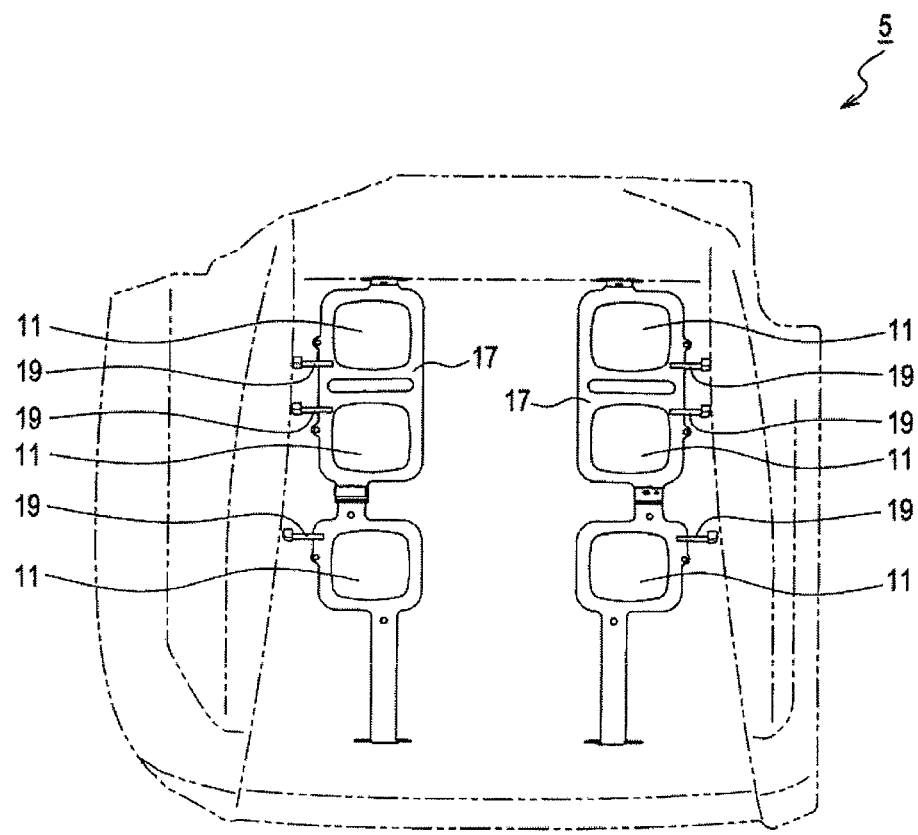
FIG. 3 is a plan view showing a configuration of a seat cushion 5.

As shown in FIGS. 1 and 3, the seat cushion 5 also includes the air bag 11. In the seat cushion 5, two air bags 11 are arranged in a seat width direction and three air bags 11 are arranged in a front-rear direction. In the seat cushion 5, the air bag 11 and a periphery thereof have a structure similar to the case of the seat back 3. However, the seat cushion 5 includes a cushion pad (not shown) in place of the back pad 7.

2. Effects of the Vehicle Seat 1

The vehicle seat 1 has the following effects.

(1A) The vehicle seat 1 includes the buffer member 13 between the air bag 11 and the surface cover 9. Therefore, the shape of the air bag 11 hardly appears on the surface of the vehicle seat 1, and a foreign body sensation caused by the air bag 11 can be suppressed. Moreover, since the buffer member 13 is elastically deformed by the expansion and contraction of the air bag 11, the expansion and contraction of the air bag 11 are hardly obstructed.

(1B) The back pad 7 and the cushion pad include the recessed portion 15 opened toward the surface cover 9. The air bag 11 is accommodated in the recessed portion 15. Therefore, a position of the air bag 11 can be suppressed from shifting.

(1C) The buffer member 13 of the seat back 3 is fixed to the back pad 7 at the fixed portion 21. In addition, the buffer member 13 of the seat cushion 5 is fixed to the cushion pad at the fixed portion 21. Therefore, the position of the buffer member 13 can be suppressed from shifting.

(1D) The thickness of the fixed portion 21 is not substantially changed when the air bag 11 expands and contracts. Therefore, when the air bag 11 expands and contracts, stress is hardly applied to the fixed portion 21. As a result, the fixed portion 21 can be suppressed from being separated from the back pad 7 and the cushion pad.

Other Embodiments

Although the embodiment for carrying out the present disclosure is described above, the present disclosure is not limited to the above embodiment, and various modifications can be carried out.

The fixed portion 21 of the buffer member 13 may be fixed to the outer edge portion 17, the tube 19, or the like. When the fixed portion 21 is fixed to the back pad 7 or the cushion pad, it may be fixed to the outer edge portion 17, the tube 19, or the like. The outer edge portion 17 and the tube 19 correspond to a portion except for the air bags 11 in the shape change unit.

Figure 5:
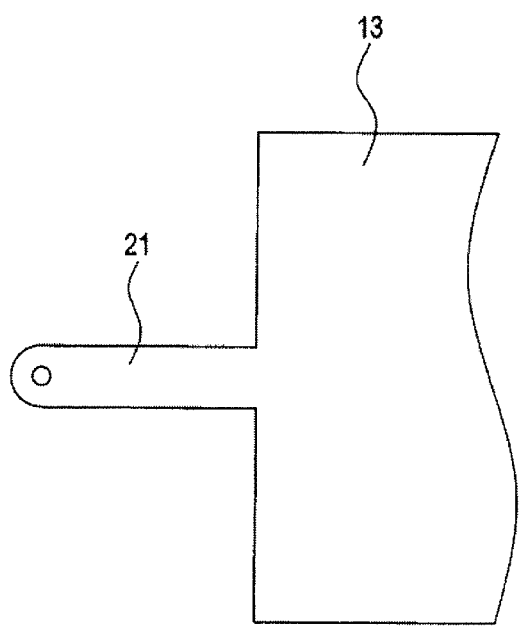
FIG. 5 is a plan view showing another embodiment of the buffer member 13.
Figure 6:
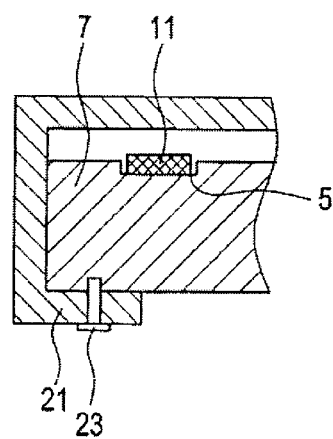
FIG. 6 is a sectional view showing a fixed state of the fixed portion 21.

(2) As shown in FIG. 5, the fixed portion 21 at the buffer member 13 of the seat back 3 may be a protrusion portion. In this case, as shown in FIG. 6, the fixed portion 21 is bent so that a vicinity of the tip end of the fixed portion 21 can be abutted on a back surface of the back pad 7. Then, at the back surface of the back pad 7, the fixed portion 21 can be attached to the back pad 7 by using a screw 23 or the like.

The fixed portion 21 of the buffer member 13 of the seat cushion 5 can be attached to the back pad 7 in a similar way.

In the case where the fixed portion 21 has the above embodiment, a distance between the fixed portion 21 and the air bag 11 can be further increased. As a result, when the air bag 11 expands and contracts, further stress is hardly applied to the fixed portion 21. As a result, the fixed portion 21 can be further suppressed from being separated from the object to which the fixed portion 21 is fixed (e.g., the back pad 7, the cushion pad, the outer edge portion 17, the tube 19, etc.).

(3) The vehicle seat 1 may be used for vehicles (e.g., railway vehicles, aircrafts, ships, or the like) other than an automobile.

(4) Functions of one constituent element in above embodiments may be allocated to a plurality of constituent elements, or functions of a plurality of constituent elements may be exerted in one constituent element. Also, a part of configurations of the above embodiments may be omitted. At least a part of the configurations of the above embodiments may be added to, or replaced by configurations of other embodiments described above. In addition, all aspects included in the technical concept specified from the wording described in the claims are embodiments of the present disclosure.

The disclosure provides illustrative, non-limiting examples as follows:

An aspect of the present disclosure provides a vehicle seat including: an surface cover covering a surface of the vehicle seat; a pad; a shape change unit including an air bag configured to expand and contract and configured to change a shape of the surface of the vehicle seat; and a buffer member provided between the air bag and the surface cover, wherein the buffer member is configured to be deformed elastically by expansion and contraction of the air bag.

The vehicle seat according to an aspect of the present disclosure includes the buffer member between the air bag and the surface cover. Therefore, the shape of the air bag hardly appears on the surface of the vehicle seat, and the foreign body sensation caused by the air bag can be suppressed. Moreover, since the buffer member is elastically deformed by the expansion and contraction of the air bag, the expansion and contraction of the air bag are hardly disturbed.

The vehicle seat according to an aspect of the present disclosure may further include, for example, the following configuration 1.

(Configuration 1) The pad includes a recessed portion opened toward the surface cover, and at least a part of the air bag is configured to be accommodated in the recessed portion.

In the case where the vehicle seat according to an aspect of the present disclosure further includes the configuration 1, a position of the air bag can be suppressed from shifting.

The vehicle seat according to an aspect of the present disclosure may further include, for example, the following configuration 2.

(Configuration 2) The buffer member includes a fixed portion fixed to at least one of the pad and a portion of the shape change unit except for the air bag.

In the case where the vehicle seat according to an aspect of the present disclosure further includes the configuration 2, a position of the buffer member can be suppressed from shifting.

The vehicle seat according to an aspect of the present disclosure may further include, for example, the following configuration 3.

(Configuration 3) A thickness of the fixed portion is not substantially changed when the air bag expands and contracts.

In the case where the vehicle seat according to an aspect of the present disclosure further includes the configuration 3, when the air bag expands and contracts, stress is hardly applied to the fixed portion. Therefore, the separation of the fixed portion from the pad and the shape change unit can be suppressed.

The vehicle seat according to an aspect of the present disclosure may further include, for example, the following configuration 4.

(Configuration 4) The buffer member includes a main portion and a protrusion portion, and the fixed portion includes the protrusion portion.

In the case where the vehicle seat according to an aspect of the present disclosure further includes the configuration 4, the distance between the protrusion portion and the air bag can be further increased. As a result, when the air bag expands and contracts, further stress is hardly applied to the protrusion portion. Therefore, the protrusion portion can be suppressed from separating from the pad and the shape change unit.

The vehicle seat according to an aspect of the present disclosure may further include, for example, the following configuration 5.

(Configuration 5) The buffer member is bonded to the surface cover.

What is claimed is:

1. A vehicle seat comprising:
   a surface cover covering a surface of the vehicle seat;
   a pad;
   a shape change unit including an air bag configured to expand and contract and configured to change a shape of the surface of the vehicle seat; and
   a buffer member provided between the air bag and the surface cover,
   wherein the buffer member is configured to be deformed elastically in an expansion/contraction direction of the air bag by expansion and contraction of the air bag, such that a thickness portion of the buffer member is reduced, and
   wherein the buffer member includes a fixed portion fixed to a portion of the shape change unit except for the air bag.

2. The vehicle seat according to claim 1,
   wherein the pad includes a recessed portion opened toward the surface cover, and
   wherein at least a part of the air bag is configured to be accommodated in the recessed portion.

3. The vehicle seat according to claim 1,
   wherein the buffer member includes the fixed portion fixed to the pad.

4. The vehicle seat according to claim 3,
   wherein a thickness of the fixed portion is not substantially changed when the air bag expands and contracts.

5. The vehicle seat according to claim 3,
   wherein the buffer member includes a main portion and a protrusion portion, and
   wherein the fixed portion includes the protrusion portion.

6. The vehicle seat according to claim 1,
   wherein the buffer member is bonded to the surface cover.

7. The vehicle seat according to claim 1, wherein the buffer member includes the fixed portion fixed to an outer-peripheral edge of the pad, and
   wherein the buffer member is not fixed to a portion except for the outer-peripheral edge of the pad.

8. A vehicle seat comprising:
   a surface cover covering a surface of the vehicle seat;
   a pad;
   a shape change unit including an air bag configured to expand and contract and configured to change a shape of the surface of the vehicle seat; and
   a buffer member provided between the air bag and the surface cover,
   wherein the buffer member is configured to be deformed elastically in an expansion/contraction direction of the air bag by expansion and contraction of the air bag, such that a thickness portion of the buffer member is reduced,
   wherein the buffer member includes a fixed portion fixed to at least one of an outer-peripheral edge of the pad and a portion of the shape change unit except for the air bag, and
   wherein the buffer member is not fixed to a portion except for the outer-peripheral edge of the pad.

* * * * *